United States Patent
Won et al.

(10) Patent No.: US 12,257,938 B2
(45) Date of Patent: Mar. 25, 2025

(54) HEADREST DEVICE FOR VEHICLE

(71) Applicants: Hyundai Motor Company, Seoul (KR); Kia Corporation, Seoul (KR); WOOBO TECH CO., LTD., Pyeongtaek-si (KR); Hyundai Transys Inc., Seosan-si (KR)

(72) Inventors: Tae Hee Won, Uiwang-Si (KR); Jun Ho Lee, Yongin-Si (KR); Hae Il Jeong, Incheon (KR); Hyun Kim, Hwaseong-Si (KR)

( * ) Notice: Subject to any disclaimer, the term of this patent is extended or adjusted under 35 U.S.C. 154(b) by 114 days.

(21) Appl. No.: 18/118,314

(22) Filed: Mar. 7, 2023

(65) Prior Publication Data

US 2024/0092243 A1    Mar. 21, 2024

(30) Foreign Application Priority Data

Sep. 19, 2022   (KR) .......................... 10-2022-0117899

(51) Int. Cl.
| | |
|---|---|
| *B60N 2/80* | (2018.01) |
| *B60N 2/809* | (2018.01) |
| *B60N 2/821* | (2018.01) |
| *B60N 2/829* | (2018.01) |
| *B60N 2/894* | (2018.01) |
| *B60R 16/033* | (2006.01) |

(52) U.S. Cl.
CPC ............ *B60N 2/829* (2018.02); *B60N 2/809* (2018.02); *B60N 2/821* (2018.02); *B60N 2/894* (2018.02); *B60R 16/033* (2013.01)

(58) Field of Classification Search
CPC ................................ B60N 2/809; B60N 2/821
See application file for complete search history.

(56) References Cited

U.S. PATENT DOCUMENTS

| | | | | |
|---|---|---|---|---|
| 2015/0130247 A1* | 5/2015 | Kondrad | ............... | B60N 2/865 |
| | | | | 297/410 |
| 2016/0250953 A1* | 9/2016 | Yoo | ........................ | B60N 2/829 |
| | | | | 297/410 |
| 2019/0168649 A1* | 6/2019 | Watson | .................. | B60N 2/829 |
| 2019/0184878 A1* | 6/2019 | Milner | ................... | B60N 2/853 |
| 2020/0282865 A1* | 9/2020 | Samain | .................. | B60N 2/233 |

(Continued)

FOREIGN PATENT DOCUMENTS

| | | | | | |
|---|---|---|---|---|---|
| CN | 109455126 A | * | 3/2019 | ............. | B60N 2/829 |
| CN | 110843625 A | * | 2/2020 | ........... | B60N 2/4214 |
| CN | 110893800 A | * | 3/2020 | ............... | B60N 2/22 |

(Continued)

*Primary Examiner* — Timothy J Brindley
(74) *Attorney, Agent, or Firm* — Banner & Witcoff, Ltd.

(57) ABSTRACT

Disclosed is a headrest device for a vehicle. The headrest device may include a stationary headrest portion coupled to a seatback of the vehicle and formed to extend upwards. The stationary headrest portion may be located at a rear of a head of an occupant. The headrest device may include a movable headrest portion coupled to the stationary headrest portion so as to be slidable in a vertical direction, the movable headrest portion may be located in front of the stationary headrest portion. The headrest device may include an actuator including a first side coupled to the fixed part, and a second side coupled to the movable headrest portion. The actuator may be configured to cause the movable headrest portion to slide in the vertical direction.

11 Claims, 4 Drawing Sheets

(56) References Cited

U.S. PATENT DOCUMENTS

2022/0314856 A1* 10/2022 Hildenbrand .......... B60N 2/829
2024/0140287 A1* 5/2024 Shen ...................... B60N 2/829

FOREIGN PATENT DOCUMENTS

| | | | | | |
|---|---|---|---|---|---|
| CN | 113232567 | A | * | 8/2021 | |
| CN | 216915626 | U | * | 7/2022 | ............. B60N 2/821 |
| DE | 202018106289 | U1 | * | 3/2020 | ............. B60N 2/821 |
| EP | 3486116 | B1 | | 8/2020 | |
| FR | 3106792 | A1 | * | 8/2021 | ............. B60N 2/809 |
| JP | 6662613 | B2 | | 3/2020 | |
| KR | 101601535 | B1 | | 3/2016 | |
| KR | 10-2021-0082813 | A | | 7/2021 | |
| KR | 102362526 | B1 | * | 2/2022 | |

* cited by examiner

HEADREST DEVICE FOR VEHICLE

CROSS-REFERENCE TO THE RELATED APPLICATION

This application claims priority from Korean Patent Application No. 10-2022-0117899, filed on Sep. 19, 2022, in the Korean Intellectual Property Office, the disclosure of which is incorporated herein by reference in its entirety.

BACKGROUND

1. Field

The present disclosure relates to a headrest device for a vehicle, and more particularly to a movable headrest device.

2. Description of the Related Art

A vehicle headrest may be installed on the upper side of a seatback to support the head of an occupant in a stable position, thereby providing comfort to the occupant and relieving fatigue of the occupant. Further, the vehicle headrest may protect the head of the occupant from impact in the event of a vehicle collision and support the neck of the occupant, thereby having an effect of reducing injuries.

The headrest generally has a pair of headrest stays inserted into the upper end of the seatback, and a headrest locking unit is provided at the upper end of the seatback to fix the position of the pair of headrest stays or to adjust the vertical height when the position thereof is adjusted.

A headrest of the related art is manually operated to be vertically moved and is locked and fixed by a guide pin. Accordingly, there are problems in that the height of the headrest may not be finely adjusted and user convenience deteriorates due to manual operation.

The information disclosed in this Background section is only for enhancement of understanding of the general background of the disclosure, and should not be taken as an acknowledgement or any form of suggestion that this information forms the related art already known to a person skilled in the art.

SUMMARY

The present disclosure has been made in view of the above and other problems. The present disclosure may provide a headrest device for a vehicle, the headrest device including a stationary headrest portion, a movable headrest portion, and an actuator. The stationary headrest portion may be coupled to a seatback of the vehicle and formed to extend upwards. The stationary headrest portion may be located at a rear of a head of an occupant. The movable headrest portion may be coupled to the stationary headrest portion so as to be slidable in a vertical direction. The movable headrest portion may be located in front of the stationary headrest portion. The actuator may include: a first side coupled to the stationary headrest portion, and a second side coupled to the movable headrest portion. The actuator may be configured to cause the movable headrest portion to slide in the vertical direction.

The actuator may further include a driving motor including a rotation shaft. The driving motor may be coupled to the stationary headrest portion. The driving motor may be configured to rotate the rotation shaft. The actuator may further include a lead screw coupled to the rotation shaft of the driving motor and formed to extend in the vertical direction. The actuator may further include a carrier. The carrier may include: a first side coupled to the lead screw and configured to move in the vertical direction according to rotation of the lead screw, and a second side coupled to the movable headrest portion.

The actuator may further comprise a power supply coupled to the driving motor. The actuator may be configured to receive at least one of: power from an external power source, or a control signal for the driving motor.

The actuator may further include a guide pin formed to extend in a direction in which the lead screw extends and coupled to the stationary headrest portion. The guide pin may be coupled to the carrier to guide a movement direction of the carrier.

The actuator may further include a motor cover formed to at least partially cover the driving motor and coupled to the stationary headrest portion.

The lead screw may be disposed in an inclined direction toward a rear of the vehicle. The movable headrest portion may be movable in an upward-and-downward direction or a forward-and-rearward direction of the vehicle along the inclined direction of the lead screw.

The stationary headrest portion may include a stay formed to extend upwards from the seatback, and a bracket coupled to an upper end of the stay. The actuator may be affixed to the brackets.

The stationary headrest portion may further include a back cover configured to at least partially cover: the bracket, and a rear surface of the actuator.

The bracket may include an upper flap and a lower flap. The upper flap and the lower flap may be formed to extend forward. The upper flap and the lower flap may be configured to at least partially cover an upper portion of the actuator and a lower portion of the actuator, respectively. The upper portion and the lower portion of the actuator may be respectively coupled to the upper flap and the lower flap.

The bracket may include side flaps formed to extend forward from opposite sides of the bracket and configured to at least partially cover opposite side surfaces of the actuator, respectively.

The movable headrest portion may include a front frame configured to at least partially cover: a front side of the stationary headrest portion, and the actuator. The front frame may be coupled to the actuator and configured to move in the vertical direction. The movable headrest portion may further include a front cover configured to at least partially cover the front frame.

The front frame may have an inner cavity formed above the stationary headrest portion. The stationary headrest portion may be inserted into the inner cavity based on the actuator sliding the front frame downward.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Specific structural or functional descriptions given in connection with the embodiments of the present disclosure disclosed in the specification or the application are merely illustrative for the purpose of describing embodiments according to the present disclosure. Further, the present disclosure may be implemented in various forms, and should not be construed as being limited to the embodiments described in the specification or the application.

Since the embodiments according to the present disclosure may be variously modified and may have various forms, specific embodiments are illustrated in the drawings and described in detail in the specification or the application. However, it should be understood that the embodiments according to the concept of the present disclosure are not intended to be limited to the specific disclosed forms, and include all modifications, equivalents, and substitutes that fall within the spirit and technical scope of the present disclosure.

Meanwhile, in the present disclosure, terms such as "first" and/or "second" may be used to describe various components, but the components are not limited by the terms. The terms are used only for the purpose of distinguishing one component from other components. For example, a first component may be referred to as a second component, and similarly, a second component may also be referred to as a first component without departing from the scope of rights according to the concept of the present disclosure.

When one component is referred to as being "connected," "coupled," or "joined" to another component, the one component may be directly connected or joined to the other component, but it should be understood that other components may be present therebetween (e.g., indirectly connected). On the other hand, when the one component is referred to as being "directly connected to" or "directly in contact with" the other component, it should be understood that no other components are present therebetween. Other expressions for the description of relationships between components, such as "between" and "directly between" or "adjacent to" and "directly adjacent to", should be interpreted in the same manner.

When a first component is referred to as "covering" a second component, the first component may cover at least partially or entirely cover the second component.

The terms used in the specification are only used to describe specific embodiments, and are not intended to limit the present disclosure. In this specification, an expression in a singular form also includes the plural sense, unless clearly specified otherwise in context. It should be understood that expressions such as "comprise" and "have" in this specification are intended to designate the presence of indicated features, numbers, steps, operations, components, parts, or combinations thereof, but do not exclude the presence or addition of one or more features, numbers, steps, operations, components, parts, or combinations thereof.

Unless otherwise defined, all terms used herein, including technical and scientific terms, have the same meanings as commonly understood by those skilled in the art to which the present disclosure pertains. Terms such as those defined in commonly used dictionaries should be interpreted as having meanings consistent with their meanings in the context of the related technology. Further, unless explicitly defined in this specification, the terms should not be interpreted in an ideal or overly formal sense.

Hereinafter, the present disclosure will be described in detail through preferred embodiments thereof with reference to the accompanying drawings. The same reference numerals in each drawing represent the same members.

Figure 1:
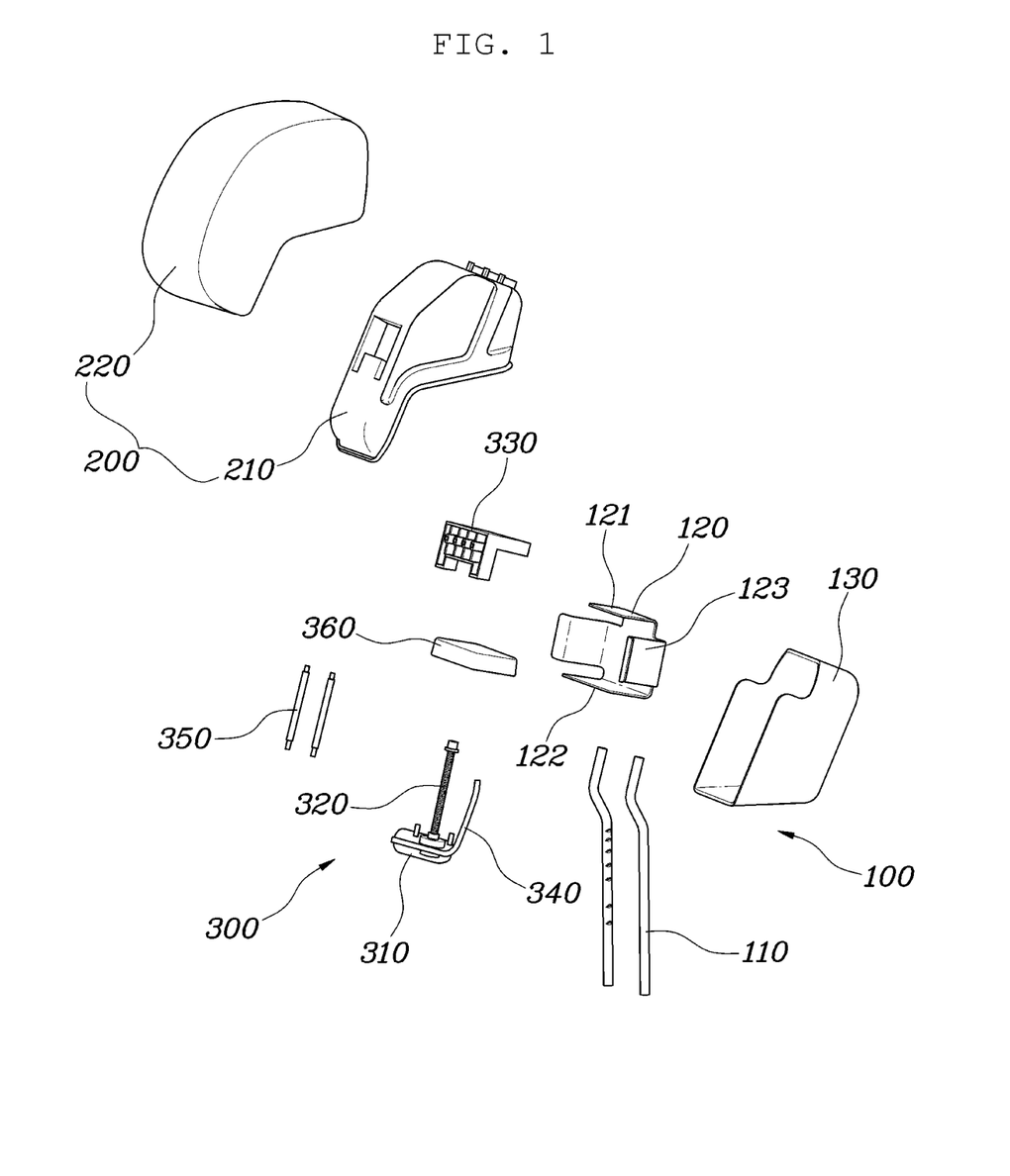
FIG. 1 is an exploded perspective view of a vehicle headrest.
Figure 2:
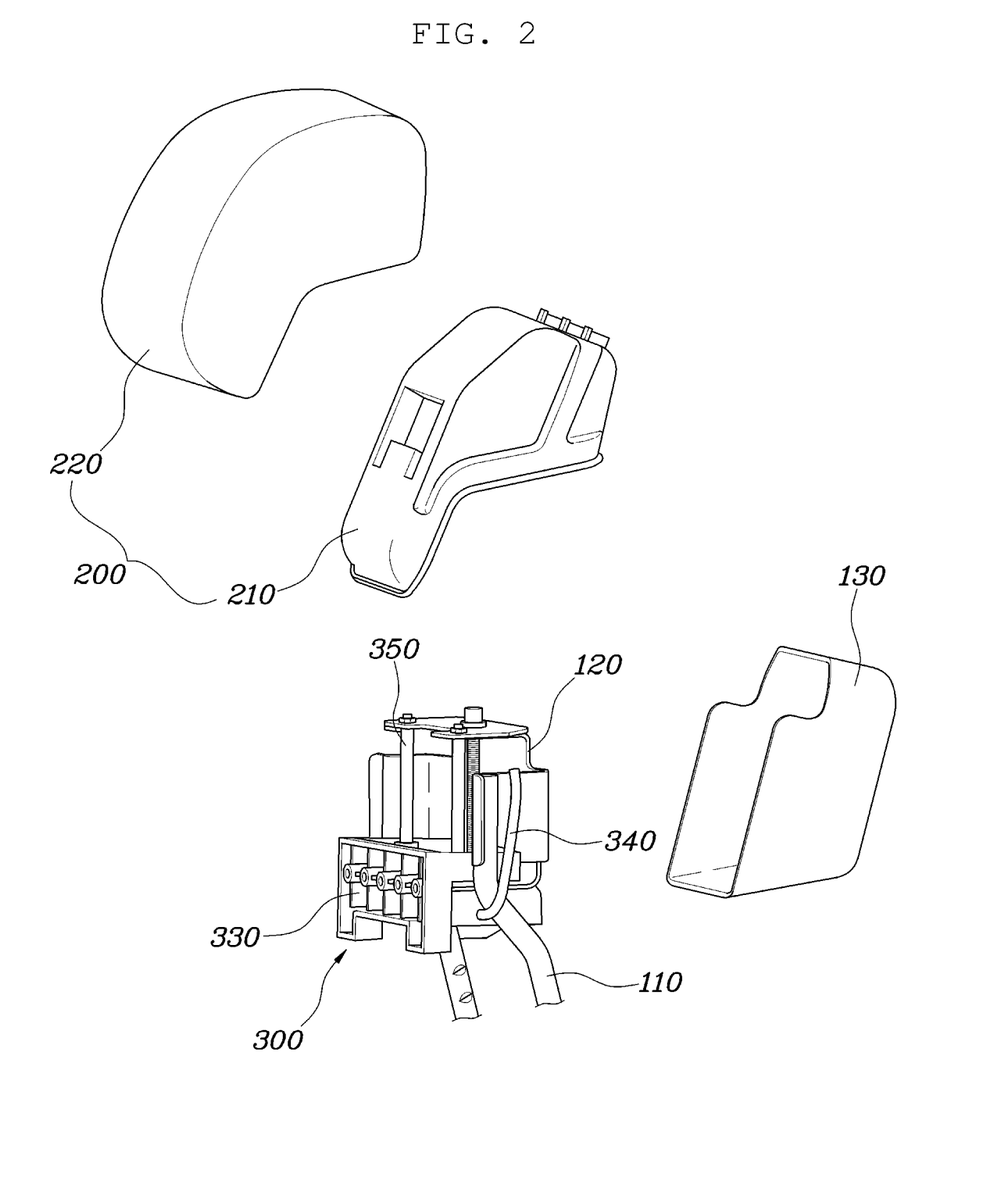
FIG. 2 is a perspective view showing an assembled actuator of the vehicle headrest.
Figure 3:
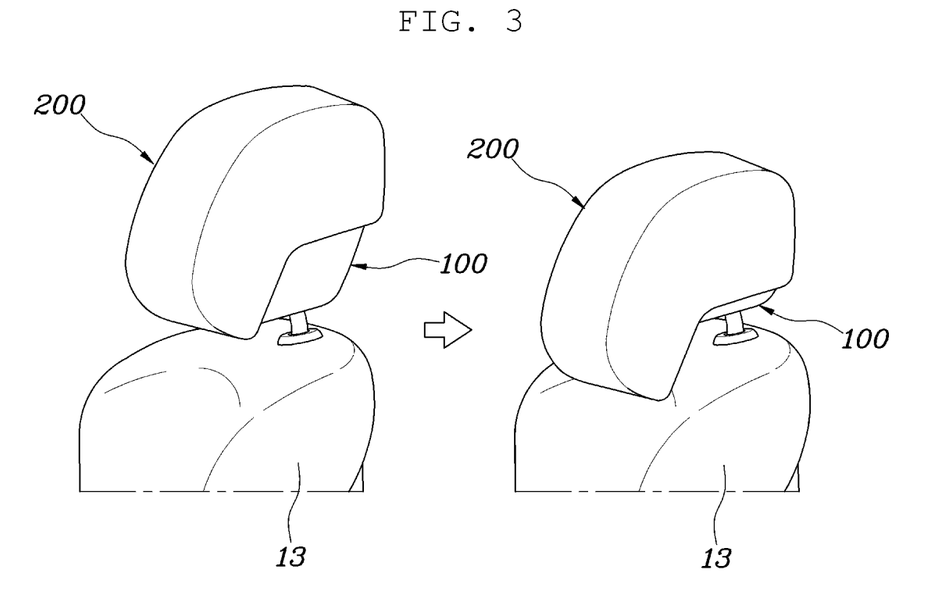
FIG. 3 is a perspective view showing operation of the vehicle headrest.
Figure 4:
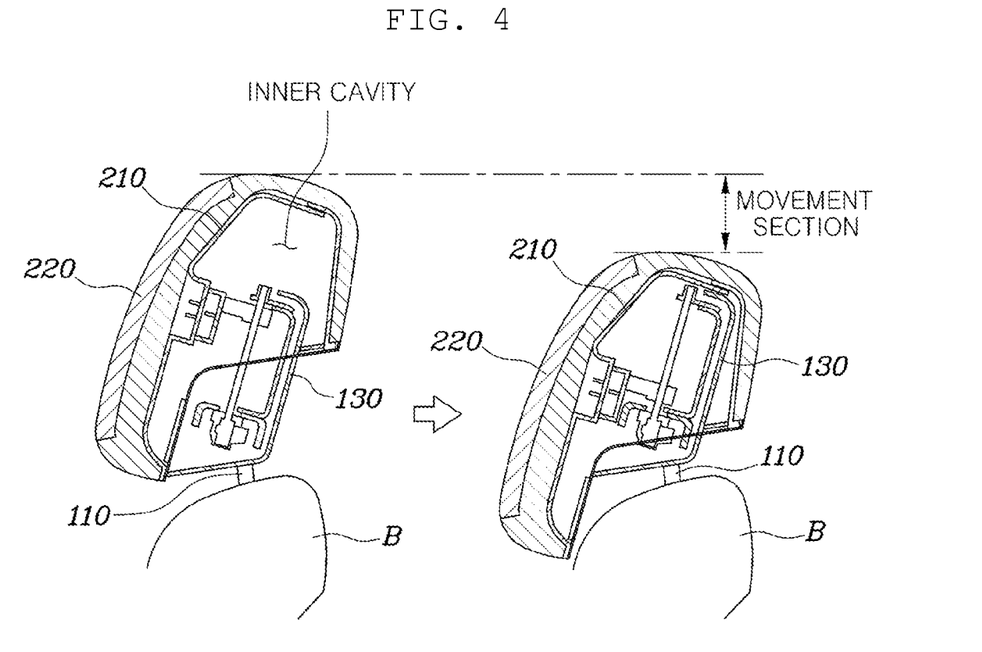
FIG. 4 is a side cross-sectional view of FIG. 3.

FIG. 1 is an exploded perspective view of a vehicle headrest, FIG. 2 is a perspective view showing an assembled actuator 300 of the vehicle headrest, FIG. 3 is a perspective view showing operation of the vehicle headrest, and FIG. 4 is a side cross-sectional view of FIG. 3.

A preferred embodiment of a headrest device for a vehicle according to the present disclosure will be described with reference to FIGS. 1 to 4.

A vehicle seat may include a seat cushion, a seatback, and a headrest, and an armrest may be additionally provided therein.

A headrest of the related art may be designed to be movable in the vertical direction depending on a height of the head of an occupant, and a device configured to manually change the vertical position of the headrest may be provided in the related art.

However, since a headrest device of the related art is provided to manually move the headrest in the vertical direction or to automatically move the same in the vertical direction, there is a problem in that the headrest may not be finely adjusted, and as such, the optimal position of the headrest may not be set for each occupant.

The headrest device for the vehicle according to the present disclosure proposes a headrest device capable of finely adjusting the position of a headrest in contact with the rear of the head of an occupant.

Specifically, the headrest device for the vehicle according to the present disclosure includes a stationary headrest portion (e.g., a fixed part) 100 connected to a seatback of the vehicle and formed to extend upwards, the stationary headrest portion 100 being located at a rear of a head of an occupant, a movable headrest portion (e.g., a moving part) 200 coupled to the stationary headrest portion 100 so as to be slidable in a vertical direction, the movable headrest portion 200 being located in front of the stationary headrest portion 100, and an actuator 300 having one side thereof (e.g., a first side) coupled to the stationary headrest portion 100 and the other side thereof (e.g., a second side) connected to the movable headrest portion 200. The actuator 300 may be configured to cause the movable headrest portion 200 to slide in the vertical direction.

The stationary headrest portion 100 may be coupled to the upper portion of the seatback to extend upwards, and may be fixed to the seatback. The movable headrest portion 200 may be provided in front of the stationary headrest portion 100 and may contact the rear of the head of the occupant. Further, the movable headrest portion 200 may be coupled to the stationary headrest portion 100 so as to be slidable in the vertical direction.

In addition, the stationary headrest portion 100 supports the movable headrest portion 200 when the rear of the head of the occupant contacts the movable headrest portion 200, thereby making it possible to protect the neck of the occupant by preventing the head of the occupant from moving rearwards in the event of vehicle collision.

Further, the actuator 300 connected to the stationary headrest portion 100 and the movable headrest portion 200 has one side thereof coupled and fixed to the stationary headrest portion 100 and the other side thereof connected to the movable headrest portion 200. During operation of the actuator 300, the actuator 300 may cause the movable headrest portion 200 along the stationary headrest portion 100 in the vertical direction, and during non-operation of the actuator 300, the actuator 300 may hold the movable headrest portion 200 in a fixed position.

The actuator 300 may be formed of a motor or a hydraulic device operated by power input thereto, and may be controlled by a control device.

Through this configuration, an occupant may adjust the position of the headrest by moving the movable headrest portion 200 upwards or downwards through an electrically powered device or the like so that the headrest is positioned at the position of the head of the occupant. Compared to a headrest device for a vehicle of the related art configured to manually adjust the position of a headrest, the headrest device for the vehicle may finely adjust the position of the headrest, thereby improving operational convenience. Furthermore, in the headrest device of the related art operated by the actuator 300, the actuator 300 requiring a large electric load is used because the entire headrest is moved in the vertical direction. On the other hand, since the actuator 300 slides only the movable headrest portion 200, the present disclosure uses the actuator 300 requiring a small electric load compared to the headrest device of the related art, thereby having an effect of reducing cost and power consumption.

Since the position of the headrest may be finely adjusted by a headrest adjustment device for a vehicle, the headrest may be appropriately adjusted to the position of the head of an occupant. Accordingly, when the head of the occupant is moved rearwards due to a front collision accident or a rear collision accident of a vehicle, the headrest supports the head to reduce impact applied to the neck, thereby having an effect of reducing injuries of the occupant.

In addition, when failure of a driving motor 310 or a lead screw 320 of the actuator 300 occurs, the stationary headrest portion 100 and the movable headrest portion 200 may be separated from each other for maintenance. Accordingly, failure of the actuator 300 may be determined, and the driving motor 310 or the lead screw 320 may be easily replaced or maintained, thereby having an effect of improving maintenance performance.

Hereinafter, a description will be given as to the actuator 300. The actuator 300 may include the driving motor 310 coupled to the stationary headrest portion 100. The driving motor 310 may include a rotation shaft, and the actuator 300 may be operated to rotate the rotation shaft of the driving motor 310. The actuator 300 may include the lead screw 320 coupled to the rotation shaft of the driving motor 310 and formed to extend in the vertical direction. The actuator 300 may include a carrier 330 having one side thereof (e.g., a first side) connected to the lead screw 320 and configured to move in the vertical direction according to rotation of the lead screw 320 and the other side thereof (e.g., a second side) connected to the movable headrest portion 200.

As shown in FIGS. 1 and 2, the driving motor 310 provided in the actuator 300 may be operated by power input thereto and may be fixed to the lower portion of the stationary headrest portion 100. The driving motor 310 is operated to rotate a driving shaft thereof, and the driving shaft may be disposed upwards.

The lead screw 320 is coupled to the rotation shaft of the driving motor 310 with the driving shaft disposed upwards and is formed to extend upwards. Further, the lead screw 320 may have a thread formed outwards.

The carrier 330 is provided with a female screw on one side thereof, wherein the female screw is fastened to the thread of the lead screw 320 so that the carrier 330 is moved in the vertical direction when the lead screw 320 rotates, and the other side thereof is coupled to the movable headrest portion 200 so that the carrier 330 is moved upwards or downwards when the driving motor 310 is operated to rotate the lead screw 320. Accordingly, the movable headrest portion 200 coupled to the carrier 330 may slide upwards or downwards with respect to the stationary headrest portion 100.

Through this configuration, it is possible to accurately position the movable headrest portion 200 at the height of the head of an occupant by finely adjusting sliding of the movable headrest portion 200 in the vertical direction. Here, such fine adjustment may be performed depending on the pitch of the thread formed in the lead screw 320.

In addition, a sliding distance of the movable headrest portion 200 may be limited by a length of the thread or a length of the lead screw 320.

As shown in FIG. 4, the lead screw 320 extending in the longitudinal direction may be disposed to be inclined (e.g., in an inclined direction) toward the rear of the vehicle, and the movable headrest portion 200 may be moved along the inclination (e.g., the inclined direction) of the lead screw 320.

The carrier 330 connected to the movable headrest portion 200 may be moved along the lead screw 320, and the lead screw 320 is disposed to be inclined toward the rear of the vehicle. Accordingly, when the driving motor 310 rotates and the carrier 330 is moved (e.g., movable) along the lead screw 320, the carrier 330 may be moved in the vertical direction, and/or may be moved in the forward-and-rearward direction of the vehicle, thereby having an effect of positioning the headrest at a position desired by an occupant.

The actuator 300 may further include a power supply part 340 connected to the driving motor 310 to receive power from the outside (e.g., an external power source) or a control signal for the driving motor 310.

As shown in FIGS. 1 and 2, the driving motor 310 provided in the actuator 300 may be operated by receiving external power, and the power supply part 340 may be connected to a power supply device such as a battery provided in the vehicle to input power to the driving motor 310.

Additionally, the power supply part 340 may be connected to a switch provided separately in the vehicle, wherein the switch inputs, to the driving motor 310, a control signal of controlling forward rotation or reverse rotation of the driving motor 310.

Through this configuration, when an occupant operates the headrest device for the vehicle, there is an effect of improving user convenience compared to the manually operated headrest device of the related art.

The actuator 300 may further include a guide pin (e.g., a guide part) 350 formed to extend in a direction in which the lead screw 320 extends and coupled to the stationary headrest portion 100, wherein the guide pin 350 is connected to the carrier 330 to guide the movement direction of the carrier 330.

As shown in FIGS. 1 and 2, the carrier 330 provided in the actuator 300 is moved in the vertical direction by the operation of the lead screw 320, and the guide pin 350 formed to extend in the direction in which the lead screw 320 extends passes through the carrier 330 to be connected to the carrier 330. Further, opposite ends of the guide pin 350 may be coupled to the stationary headrest portion 100. The actuator may be affixed to the bracket. Additionally, a plurality of guide pins 350 may be provided to be spaced apart from each other in the left-and-right direction of the seat and may be connected to the carrier 330.

Through this configuration, when the carrier 330 moves in the vertical direction, the same may be guided in the direction in which the guide pin 350 extends. Accordingly, the carrier 330 and the movable headrest portion 200 connected to the carrier 330 may be prevented from being moved in the left-and-right direction of the vehicle during movement of the vehicle or operation of the motor.

The actuator 300 may further include a motor cover 360 formed to cover the outside of the driving motor 310 and coupled to the stationary headrest portion 100.

As shown in FIGS. 1 and 2, the driving motor 310 coupled to the stationary headrest portion 100 may not operate normally when foreign substances containing external dust or moisture enter the driving motor 310. For this reason, in order to prevent such abnormal operation or operation stop, the actuator 300 may include the motor cover 360 formed to cover the motor.

The motor cover 360 may be detachably coupled to the stationary headrest portion 100 so as to be separated from the stationary headrest portion 100 during maintenance of the driving motor 310.

The stationary headrest portion 100 may include a stay 110 formed to extend upwards from the seatback and a bracket 120 coupled to the upper end of the stay 110, the bracket 120 having the actuator 300 fixed thereto.

As shown in FIGS. 2 to 4, the stationary headrest portion 100 includes the stay 110 formed to extend upwards from the upper portion of the seatback, and the bracket 120 coupled to the upper end of the stay 110 and connected to the movable headrest portion 200 so that the movable headrest portion 200 is slidable.

The position of the stationary headrest portion 100 may be determined depending on the length of the stay 110, and this position may be changed depending on the design of a designer.

One side of the actuator 300 is coupled to the bracket 120, the other side of the actuator 300 is coupled to the movable headrest portion 200, and the movable headrest portion 200 is coupled to the bracket 120 so as to be slidable in the vertical direction.

Specifically, the driving motor 310 is fixed to the lower portion of the bracket 120, and the other end of the lead screw 320 having one side thereof connected to the rotation shaft of the driving motor 310 is rotatably coupled to the upper portion of the bracket 120, thereby stably performing rotation when the lead screw 320 rotates. In addition, the guide pin 350 is formed so that opposite ends thereof are respectively coupled to the upper and lower portions of the bracket 120, thereby having an effect of stably operating the actuator 300.

The bracket 120 has an upper flap (e.g., an upper end part) 121 and a lower flap (e.g., a lower end part) 122 respectively formed to extend forward from the upper end of the bracket 120 and the lower end thereof to cover the upper portion and the lower portion of the actuator 300, and the upper portion and the lower portion of the actuator 300 may be coupled to the upper flap 121 and the lower flap 122, respectively.

Specifically, the bracket 120 coupled to the upper end of the stay 110 has the upper flap 121 formed to extend forward from the upper end thereof and the lower flap 122 formed to extend forward from the lower end thereof, thereby protecting the upper portion and the lower portion of the actuator 300 fixed to the bracket 120 from the outside.

Further, the upper end of the lead screw 320 provided in the actuator 300 and formed to extend in the vertical direction is rotatably coupled to the upper flap 121, and the driving motor is coupled to the lower flap 122, whereby the carrier 330 may be moved in the vertical direction along the lead screw 320 when the driving motor 310 rotates.

In addition, the bracket 120 may include side flaps (e.g., side parts) 123 respectively formed to extend forward from opposite side ends of the bracket 120.

A pair of side flaps 123 formed to extend forward from the opposite side ends of the bracket 120 may be formed to protect the side surfaces of the actuator 300 coupled to the bracket 120, and the side flaps 123 may protect the opposite sides of the actuator 300, respectively.

In addition, the side flaps 123, the upper flap 121, and the lower flap 122 may have the same length, and the side flaps 123, the upper flap 121, and the lower end par 122 formed in the bracket 120 are formed in a box shape so that the actuator 300 may be inserted thereinto and fixed therein.

The stationary headrest portion 100 may further include a back cover 130 configured to cover the bracket 120 and the rear surface of the actuator 300 coupled to the bracket 120.

As shown in FIGS. 1 and 2, the back cover 130 formed to cover the rear surface of the bracket 120 is coupled to the bracket 120, thereby preventing the actuator 300 and the bracket 120 disposed inside from being exposed to the outside.

Through this configuration, it is possible to prevent foreign substances from entering the actuator 300. Further, the bracket 120 is not exposed to the outside and the back cover 130 covers the bracket 120, thereby having an effect of improving marketability of a vehicle.

The movable headrest portion 200 may include a front frame 210 configured to cover the front of the stationary headrest portion 100 and the actuator 300, wherein the front frame 210 is connected to the actuator 300 to move in the vertical direction, and a front cover 220 surrounding the outside of the front frame 210.

As shown in FIGS. 1 to 3, the movable headrest portion 200 includes the front frame 210 slidably coupled to the stationary headrest portion 100 in the vertical direction, and the front cover 220 may be coupled to the front frame 210 to cover the outside of the front frame 210.

The front frame 210 may be moved in the vertical direction by sliding diagonally with respect to the stationary headrest portion 100, and may set the area in contact with the occupant's head to the maximum.

Additionally, a pad may be formed on a portion of the front cover 220, the portion being in contact with the occupant's head, and the remaining portions may be formed of a fabric material or a leather material to cover the front frame 210, thereby improving marketability of a vehicle.

Specifically, the front frame 210 may cover the front side and the upper side of the stationary headrest portion 100, and may slide in the upward-and-reward direction and the forward-and-rearward direction of the vehicle while covering a part of the side of the stationary headrest portion 100.

The front frame 210 includes an inner cavity (e.g., an inner space) above the stationary headrest portion 100, and when the front frame 210 slides downwards by the actuator 300, the stationary headrest portion 100 is inserted into the inner cavity.

As shown in FIG. 4, the inner cavity into which the stationary headrest portion 100 is insertable may be provided inside the front frame 210, and when the front frame 210 slides downwards by the carrier 330, the stationary headrest portion 100 may be inserted into the inner cavity and the front frame 210 may slide downwards.

In this manner, there is an effect of reducing the space occupied by a headrest in the interior space of a vehicle.

In addition, the stationary headrest portion 100 is inserted into the inner cavity or separated from the inserted state according to the sliding of the movable headrest portion 200, thereby having an effect of maximally securing the sliding distance of the movable headrest portion 200.

As is apparent from the above description, the present disclosure provides a headrest device for a vehicle, the headrest device including a stationary headrest portion, a movable headrest portion that is movable in the vertical direction with respect to the stationary headrest portion, and an actuator operated by receiving power and configured to allow the movable headrest portion to move in the vertical direction. In this manner, an occupant may adjust the position of a headrest by moving the movable headrest portion upwards or downwards through an electric device so that the headrest is positioned at the position of the occupant's head. Further, compared to a headrest device for a vehicle of the related art configured to manually adjust the position of the headrest, the headrest device may perform fine adjustment, thereby improving operational convenience. Additionally, in the headrest device of the related art operated by an actuator, the actuator requiring a large electric load is used because the entire headrest is moved in the vertical direction. On the other hand, since the actuator slides only the movable headrest portion, the headrest device uses the actuator requiring a small electric load compared to the headrest device of the related art, thereby having an effect of reducing cost and power consumption.

Furthermore, a lead screw is disposed to be inclined toward the rear of the vehicle. Accordingly, when a driving motor rotates and a carrier is moved along the lead screw, the carrier may be moved in the vertical direction, and simultaneously, may be moved in the forward-and-rearward direction of the vehicle, thereby having an effect of positioning the headrest at a position desired by an occupant.

Although the preferred embodiments of the present disclosure have been disclosed for illustrative purposes, those skilled in the art will appreciate that various modifications, additions, and substitutions are possible, without departing from the scope and spirit of the disclosure as disclosed in the accompanying claims.

What is claimed is:

1. A headrest device for a vehicle, the headrest device comprising:
    a stationary headrest portion coupled to a seatback of the vehicle and formed to extend upwards, the stationary headrest portion being located at a rear of a head of an occupant;
    a movable headrest portion coupled to the stationary headrest portion so as to be slidable in a vertical direction, the movable headrest portion being located in front of the stationary headrest portion; and
    an actuator comprising:
        a first side coupled to the stationary headrest portion, and
        a second side coupled to the movable headrest portion,
    wherein the actuator is configured to cause the movable headrest portion to slide in the vertical direction,
    wherein the actuator further comprises:
        a driving motor comprising a rotation shaft, wherein the driving motor is coupled to the stationary headrest portion, and wherein the driving motor is configured to rotate the rotation shaft;
        a lead screw coupled to the rotation shaft of the driving motor and formed to extend in the vertical direction; and
        a carrier comprising:
            a first side coupled to the lead screw and configured to move in the vertical direction according to rotation of the lead screw, and
            a second side coupled to the movable headrest portion, and
    wherein the actuator further comprises a motor cover coupled to the stationary headrest portion and formed to at least partially cover an upper surface of the driving motor on which the lead screw is disposed, the motor cover comprising an opening through which the lead screw penetrates.

2. The headrest device according to claim 1, wherein the actuator further comprises a power supply coupled to the driving motor and configured to receive at least one of:
    power from an external power source, or
    a control signal for the driving motor.

3. The headrest device according to claim 1, wherein the actuator further comprises a guide pin formed to extend in a direction in which the lead screw extends and coupled to the stationary headrest portion, and wherein the guide pin is coupled to the carrier to guide a movement direction of the carrier.

4. The headrest device according to claim 1, wherein the lead screw is disposed in an inclined direction toward a rear of the vehicle, and
    wherein the movable headrest portion is movable in an upward-and-downward direction or a forward-and-rearward direction of the vehicle along the inclined direction of the lead screw.

5. The headrest device according to claim 1, wherein the stationary headrest portion comprises:
    a stay formed to extend upwards from the seatback; and
    a bracket coupled to an upper end of the stay, wherein the actuator is affixed to the brackets.

6. The headrest device according to claim 5, wherein the stationary headrest portion further comprises a back cover configured to at least partially cover:
    the bracket, and
    a rear surface of the actuator.

7. The headrest device according to claim 5, wherein the bracket comprises an upper flap and a lower flap, wherein the upper flap and the lower flap are formed to extend forward, and wherein the upper flap and the lower flap are configured to at least partially cover an upper portion of the actuator and a lower portion of the actuator, respectively, and
    wherein the upper portion and the lower portion of the actuator are respectively coupled to the upper flap and the lower flap.

8. The headrest device according to claim 5, wherein the bracket comprises side flaps formed to extend forward from opposite sides of the bracket and configured to at least partially cover opposite side surfaces of the actuator, respectively.

9. The headrest device according to claim 1, wherein the movable headrest portion comprises:
    a front frame configured to at least partially cover:
        a front side of the stationary headrest portion, and
        the actuator, wherein the front frame is coupled to the actuator and configured to move in the vertical direction; and
    a front cover configured to at least partially cover the front frame.

10. The headrest device according to claim 9, wherein the front frame has an inner cavity formed above the stationary headrest portion, and the stationary headrest portion is inserted into the inner cavity based on the actuator sliding the front frame downward.

11. A headrest device for a vehicle, the headrest device comprising:
- a stationary headrest portion coupled to a seatback of the vehicle, the stationary headrest portion being located at a rear of a head of an occupant;
- a movable headrest portion coupled to the stationary headrest portion so as to be movable in a vertical direction; and
- an actuator configured to cause the movable headrest portion to move in the vertical direction, wherein the actuator comprises:
  - a driving motor comprising a rotation shaft, wherein the driving motor is coupled to the stationary headrest portion, and wherein the driving motor is configured to rotate the rotation shaft;
  - a lead screw coupled to the rotation shaft of the driving motor;
  - a motor cover coupled to the stationary headrest portion and formed to at least partially cover an upper surface of the driving motor on which the lead screw is disposed, the motor cover comprising an opening through which the lead screw penetrates; and
  - a carrier comprising:
    - a first side coupled to the lead screw and configured to move in the vertical direction according to rotation of the lead screw, and
    - a second side coupled to the movable headrest portion.

* * * * *